United States Patent
Tredoux et al.

(10) Patent No.: US 8,909,775 B2
(45) Date of Patent: Dec. 9, 2014

(54) METHOD AND APPARATUS FOR INCLUDING A SECURITY FEATURE WITHIN A DOCUMENT

(75) Inventors: Gavan Leonard Tredoux, Penfield, NY (US); Steven J. Harrington, Webster, NY (US); Reiner Eschbach, Webster, NY (US); Edward Chapman, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 493 days.

(21) Appl. No.: 12/336,181

(22) Filed: Dec. 16, 2008

(65) Prior Publication Data

US 2010/0153580 A1    Jun. 17, 2010

(51) Int. Cl.
G06F 15/173 (2006.01)
G06F 21/60 (2013.01)

(52) U.S. Cl.
CPC .................................. *G06F 21/608* (2013.01)
USPC ........................................................ 709/225

(58) Field of Classification Search
USPC .......... 358/1.9, 3.28; 382/100, 151, 181, 224; 709/225, 230, 238, 246, 239; 713/176; 715/200, 209, 239
See application file for complete search history.

(56) References Cited

U.S. PATENT DOCUMENTS

| 6,577,746 B1 * | 6/2003 | Evans et al. .................... 382/100 |
| 6,829,630 B1 | 12/2004 | Pajak et al. |
| 7,133,908 B1 | 11/2006 | Pajak et al. |
| 2002/0169884 A1 * | 11/2002 | Jean et al. ...................... 709/230 |
| 2004/0128555 A1 * | 7/2004 | Saitoh et al. .................. 713/201 |
| 2005/0154891 A1 * | 7/2005 | Skipper ......................... 713/176 |
| 2006/0259983 A1 * | 11/2006 | Sperry ............................ 726/28 |
| 2007/0127770 A1 | 6/2007 | Tredoux |
| 2007/0133040 A1 | 6/2007 | Tredoux et al. |
| 2007/0133041 A1 | 6/2007 | Tredoux et al. |
| 2007/0133485 A1 | 6/2007 | Tredoux et al. |
| 2007/0177823 A1 | 8/2007 | Tredoux |
| 2010/0046015 A1 * | 2/2010 | Whittle et al. ................. 358/1.9 |
| 2010/0060925 A1 * | 3/2010 | Thomas ...................... 358/1.15 |

OTHER PUBLICATIONS

U.S. Appl. No. 12/145,591, filed Jun. 25, 2008, Tredoux.

* cited by examiner

*Primary Examiner* — Ryan Jakovac
(74) *Attorney, Agent, or Firm* — Fay Sharpe LLP

(57) ABSTRACT

Disclosed are methods and apparatus for providing extended functionality to a networked device, the networked device connected in a network, as well as corresponding apparatus and computer-readable medium. The embodiments intercept data communications in which the networked device is a party, the data communications being intercepted by an interdictor, receive at the interdictor a subscription registration for notification of a networked device event which is to be altered, the subscription registration being received from an extension service, determine whether the data communications in which the networked device is a party corresponds to the subscription registration of the networked device event which is to be altered, and modify the data communications in which the networked device is a party to provide the extended functionality when the data communications are determined to correspond to the subscription registration of networked device event to be altered. According to one exemplary embodiment, the event is altered to include a security feature within a document associated with a print job.

7 Claims, 4 Drawing Sheets

METHOD AND APPARATUS FOR INCLUDING A SECURITY FEATURE WITHIN A DOCUMENT

CROSS REFERENCE TO RELATED PATENTS AND APPLICATIONS

U.S. application Ser. No. 12/145,591, filed Jun. 25, 2008, entitled "METHOD AND APPARATUS FOR EXTENDING FUNCTIONALITY OF NETWORKED DEVICES," by Gavan Tredoux, is incorporated herein by reference in its entirety.

BACKGROUND

Disclosed are methods for extending functionality of a networked device, as well as corresponding apparatus and computer-readable medium. Specifically, methods and apparatus are disclosed which include a security feature within a document.

A device connected in a network can provide a user with desired functionality. For example, printers, scanners, facsimile devices, and the like can provide a computer user with the added functionality these devices provide. Some of these networked devices provide multiple functions, such as devices that provide the ability to print, copy, facsimile, and the like from a single device, and may be known as a multi-function device (MFD).

In order for a networked device to interface with and function with a computer or electronic device to which it is connected, a device driver can be installed on the computer. A device driver, such as a printer driver, is software which controls the networked device from the computer. The device driver may include a user interface, which may be typically accessed by a user through an operating system or an application program, such as a word processing program, a spreadsheet program, or other types of programs, and viewed on a display on the computer. Certain functionality is provided by the device driver, typically through the user interface.

However, it is very difficult for a user or administrator to extend the functionality of the networked device to include features not usually provided by the driver or the device itself. Altering the driver software or other controller software to provide added functionality is a complex process beyond the capabilities of most users. Accordingly, it would be beneficial if functionality of the networked device could be extended without altering the driver or controller software associated with the multi-function device.

Furthermore, it is desirable to add security features to printed documents to help prevent misuses of those documents. Existing schemes for doing this either require extensive alterations to the workflow process and equipment which produces those printed documents, or require specialized equipment not ordinarily present in normal office environments. This additional trouble and expense limits adoption of such techniques.

BRIEF DESCRIPTION

In one embodiment of this disclosure, a method of including a security feature within a document to be rendered with a networked device, the networked device connected in a network, comprising: receiving at an interdictor a subscription registration for notification to an extension service of a networked device event which includes providing a security feature within a document, the subscription registration being rendered with the networked device received from the extension service; intercepting data communications in which the networked device is a party, the data communications being intercepted by the interdictor; determining at the interdictor whether the data communications directed to the networked device corresponds to the subscription registration of the networked device event and routing the data communications to the extension service if the data communications correspond to the subscription registration of the networked device event; the extension service, modifying the data communications routed to the extension service to include the security feature within the document to be rendered with the networked device; routing the modified data communications to the interdictor from the extension service; and routing the modified data communications from the interdictor to the networked device for rendering the document with the security feature.

In another embodiment of this disclosure, a computer program product is disclosed. The computer program product comprises a computer-usable data carrier storing instructions, that when executed by a computer cause the computer to perform a method of including a security feature within a document to be rendered with a networked device, the networked device connected in a network comprising: receiving a subscription registration for notification to an extension service of a networked device event which includes providing a security feature within a document, the subscription registration being received from an extension service; intercepting data communications in which the networked device is a party; determining whether the data communications directed to the networked device corresponds to the subscription registration of the networked device event and routing the data communications to the extension service if the data communications correspond to the subscription registration of the networked device event; receiving from the extension service modified data communications routed from the extension service including the security feature within the document to be rendered with the networked device; and routing the modified data communications to the networked device for rendering the document with the security feature.

In still another aspect of this disclosure, an interdictor operatively connected to a network and an extension service is disclosed which comprises a computer-readable memory that stores instructions; and a controller operatively connected to the memory, wherein the controller is configured to execute the stored instructions and perform a method of including a security feature within a document to be rendered within a networked device, the method comprising: receiving a subscription registration for notification to an extension service of a networked device event which includes providing a security feature within a document, the subscription registration being received from an extension service; intercepting data communications in which the networked device is a party; determining whether the data communications directed to the networked device corresponds to the subscription registration of the networked device event and routing the data communications to the extension service if the data communications correspond to the subscription registration of the networked device event; receiving from the extension service modified data communications routed from the extension service including the security feature within the document to be rendered with the networked device; and routing the modified data communications to the networked device for rendering the document with the security feature.

DETAILED DESCRIPTION

Figure 1:
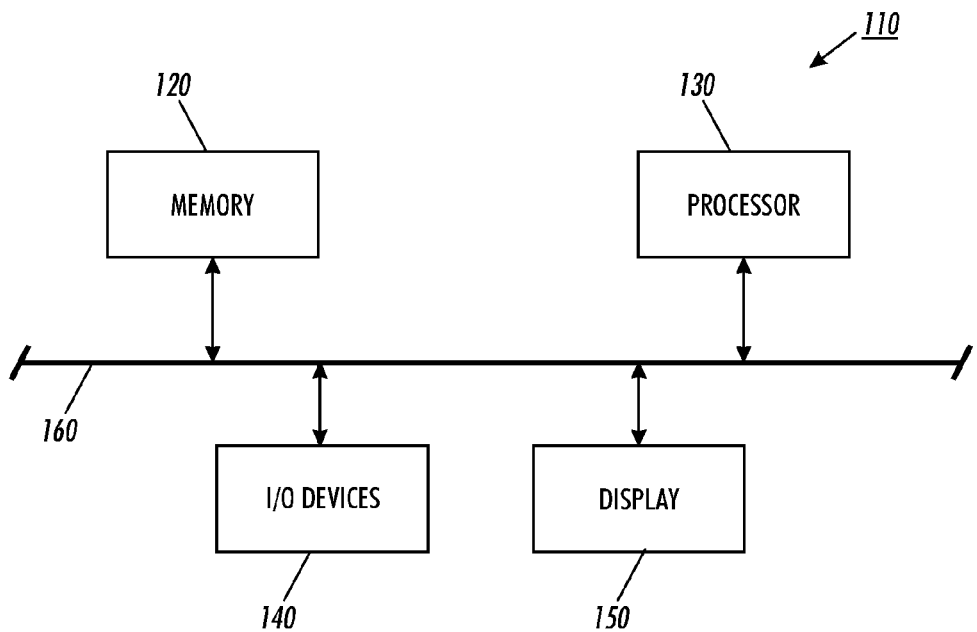
FIG. 1 illustrates a block diagram of an apparatus.

Aspects of the embodiments relate to methods for extending functionality of a networked device, as well as corresponding apparatus and computer-readable medium. The embodiments include a method of providing extended functionality to a networked device, the networked device connected in a network. The method includes intercepting data communications between the networked device and the client device with an interdictor, receive at the interdictor a subscription registration for notification of a networked device event which is to be altered, the subscription registration being received from an extension service, determining whether the data communications in which the networked device is a party corresponds to the subscription registration of the networked device event which is to be altered, and modifying the data communications in which the networked device is a party to provide the extended functionality when the data communications are determined to correspond to the subscription registration of networked device event to be altered.

The embodiments further include an interdictor for connection in a network to a networked device, and for connection to an extension service, the interdictor providing extended functionality to the networked device. The interdictor may include a memory that stores instructions, and a controller connected to the memory, wherein the controller, based on the stored instructions, causes the interdictor to intercept communications in which the networked device is a party, receive a subscription registration for notification of a networked device event which is to be altered, the subscription registration being received from an extension service, determine whether the data communications in which the networked device is a party corresponds to the subscription registration of the networked device event which is to be altered, and modify the data communications in which the networked device is a party to provide the extended functionality when the data communications are determined to correspond to the subscription registration of networked device event to be altered.

The embodiments further include a computer-readable medium, including a computer-usable data carrier storing instructions, the instructions when executed by a controller causing the controller to: intercept data communications in which a networked device connected in a network is a party, the data communications being intercepted by an interdictor, receive a subscription registration for notification of a networked device event which is to be altered, the subscription registration being received from an extension service, and modify the data communications in which the networked device is a party to provide the extended functionality when the data communications in which the networked device is a party are determined to correspond to the subscription registration of a networked device event to be altered.

Furthermore, this disclosure provides a convenient method and system for adding security features to printed documents without requiring extensive alterations to either the devices which produce the documents or to the workflow of the enterprise which want to produce such documents. The security features can be customized to be dynamic and domain-specific, without requiring further alterations of the printing equipment or client software used to print the document. This provides an easy and cost-effective path to adoption.

As used herein, a networked device is a device that is connected in a network typically to one or more computer users to provide certain functionality to the computer users. Examples of networked devices are a printer, a scanner, a copier, a facsimile device, a device combining the functionality of any of these devices (often referred to as a multifunction device (MFD)), and the like.

FIG. 1 illustrates a diagram of a system or apparatus 110. The system 110 may be embodied within devices such as a desktop computer, a laptop computer, a handheld computer, a handheld communication device, or another type of computing or electronic device, or the like. The system 110 may include a memory 120, a processor 130, input/output devices 140, a display 150 and a bus 160. The bus 160 may permit communication and transfer of signals among the components of the computing device 110. The display 150 and input/output devices 140 may not be needed in certain embodiments.

Processor 130 may include at least one conventional processor or microprocessor that interprets and executes instructions. The processor 130 may be a general purpose processor or a special purpose integrated circuit, such as an ASIC, and may include more than one processor section. Additionally, the system 110 may include a plurality of processors 130.

Memory 120 may be a random access memory (RAM) or another type of dynamic storage device that stores information and instructions for execution by processor 130. Memory 120 may also include a read-only memory (ROM) which may include a conventional ROM device or another type of static storage device that stores static information and instructions for processor 130. The memory 120 may be any memory device that stores data for use by system 110.

Input/output devices 140 (I/O devices) may include one or more conventional input mechanisms that permit a user to input information to the system 110, such as a microphone, touchpad, keypad, keyboard, mouse, pen, stylus, voice recognition device, buttons, and the like, and output mechanisms such as one or more conventional mechanisms that output information to the user, including a display, one or more speakers, a storage medium, such as a memory, magnetic or optical disk, disk drive, a printer device, and the like, and/or interfaces for the above. The display 150 may typically be an LCD or CRT display as used on many conventional computing devices, or any other type of display device.

The system 110 may perform functions in response to processor 130 by executing sequences of instructions or instruction sets contained in a computer-readable medium, such as, for example, memory 120. Such instructions may be read into memory 120 from another computer-readable medium, such as a storage device, or from a separate device via a communication interface, or may be downloaded from an external source such as the Internet. The system 110 may be a stand-alone system, such as a personal computer, or may be connected to a network such as an intranet, the Internet, and the like. Other elements may be included with the system 110 as needed.

The memory 120 may store instructions that may be executed by the processor to perform various functions. For example, the memory may store printer driver or other instructions to allow the system to perform various printing functions in association with a particular printer connected to the system. The printer driver instructions are typically unique to each specific type of printer, and the system 110 may store a plurality of print drivers each for a different printer. Instructions for drivers for networked devices other than printers may also be used.

Figure 2:
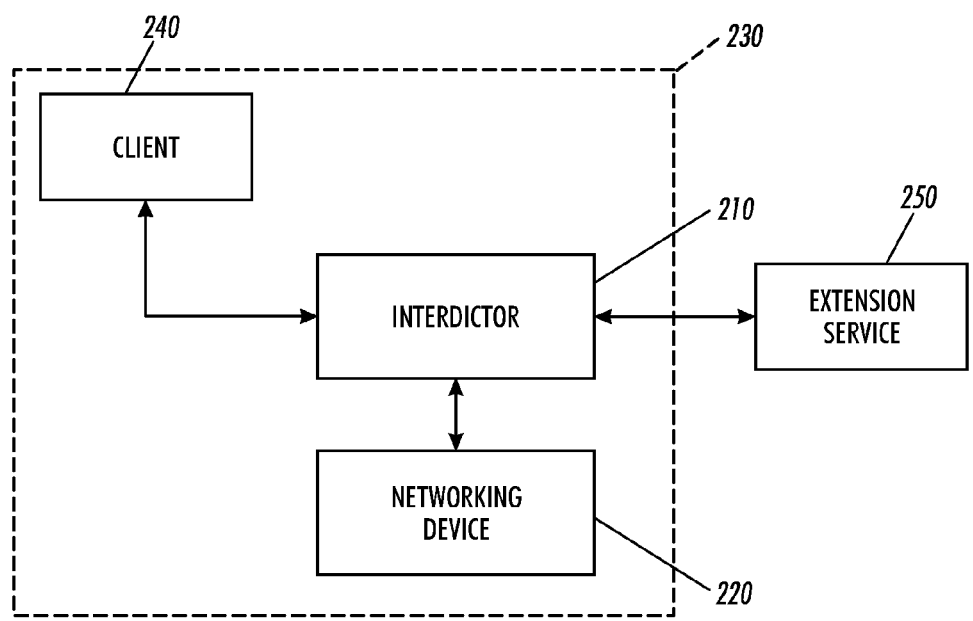
FIG. 2 illustrates a block diagram of a network including an apparatus for providing extended functionality to a networked device.

FIG. 2 illustrates an interdictor 210 as it may be used in conjunction with a networked device (ND) 220. The networked device 220 may be a device connected in a network, such as network 230, which may be connected to one or more computing device or client 240, for example. The networked device 220 may be a printer, a scanner, a copier or another device connected in a network that may be used by one or more network users, and may be a device commonly known as a multi-function device (MFD), which may provide multiple functions to a user connected to the MFD, such as printing, scanning, facsimile, photo printing, and the like. The interdictor 210 typically may include some or all of the elements of system 110, including the memory 120, the processor 130, and bus 160, although the display 150 and I/O devices 140 may not be needed. The interdictor 210 may be embodied on a printed circuit board, may be a device having its own housing, or may be embodied as a program stored in a memory and running on a processor.

The interdictor 210 may be connected between the networked device 220 and a client 240 in the network 230. The client 240 may be a device such as a print spooler or other element that would normally control the networked device 210. The client 240 may be running on a print server, for example. Also, one or more extension service 250 may be connected to the interdictor 210. The extension service 250 may be located remotely from the interdictor 210, such as across an Internet connection, may be located on a local server such as inside network 230, or may be located outside of network 230. In certain situations, a client 240 may not be involved, such as when the networked device 210 is operating as for example a scanner, and the scanned electronic file is stored to a target such as a repository.

The elements of FIG. 2 may be connected together in any conventional manner, such as wired, wireless, and the like. Further, the elements of FIG. 2 may be at different physical locations.

The networked device 220 will provide certain functionality to a user. The functionality may be controlled by a driver program associated with the device. For example, where the networked device 220 is a printer, a print driver may control functionality used for printing in association with a client 240, which may be a print server. The interdictor 210 is placed between the networked device 220 and the client 240 to intercept communications between the networked device 220 and the client 240. Where there is no client 240 or driver used, outgoing network traffic to the target can be interdicted by interdictor 210. The interdictor 210 extends functionality normally provided by the networked device 220 (such as provided by a device controller) and the print driver (when used) by altering data sent between the client 240 and the networked device 220, or other outgoing traffic from the networked device. In this way, the functionality can be extended in a way that may not be visible to the networked device 220 or the client 240 (when used), and does not require any alteration to the networked device 220 or the client 240. For example, a device controller and associated software, or a print driver or other driver, would not need to be altered.

The extension service 250 is connected to the interdictor 210. The extension service 250 may be located outside of network 230; within the network 230, such as on a LAN or WAN; or, within the networked device 220 itself. The interdictor 210 may allow one or more extension services 250 to register with the interdictor 210. The registration may be a subscription registration. The extension services 250 may be external to the network 230 and may connect to the interdictor 210 over another network such as the Internet. A user or administrator of network 230 may be able to choose which extension services 250 to allow registering with interdictor 210, based on a functionality that is desired to be added, for example. The elements in FIG. 2 will generally communicate using a standard set of network protocols, such as TCP/IP, although any network protocol could be used.

Generally, the interdictor 210 will bind to network ports of the networked device 220 and will by default simply forward traffic between the networked device 220 and the client 240. This may be done in a highly efficient manner. The interdictor 210 could use Network Address Translation (NAT) to forward traffic, for example.

As an example of a type of extended functionality that may be provided, where the networked device 220 is a scanner providing scanning functionality or is an MFD with scanning capability, an administrator or user may decide it would be desirable to watermark every scanned document with a company logo, but the controller for the scanner has no such watermarking functionality. The scanner may not use a driver or client for the scanning functionality, but the interdictor 210 can interdict the scanned file as outgoing network traffic, and through use of the extension service, add the watermark.

This could be put in place by an administrator of a corporate network, for example, and could happen without any election by users on the network. The administrator could find such an extension service 250 on the Internet or otherwise, or could set up the interdictor 210 to allow registration of an extension service to add a watermark to every scanned document. The administrator could input a logo or other item to be used as the watermark using an interface, for example.

As another example of a type of extended functionality that may be provided, where the networked device 220 is a printer providing printing functionality or is an MFD with printing capability, an administrator or user may decide it would be desirable to extend functionality of the printer. For example, one may desire to add security features, such as microtext, to each page printed, to prohibit altogether printing of certain documents or documents with certain content, or to add other extended functionality. Where the printer is run by a driver and connected to a client such as a print spooler, the interdictor is placed between the printer and client 240 to intercept communications and add the desired functionality through the use of the extension service 250.

Thus, the interdictor 210 and extension service 250 may be used to extend functionality when the networked device 220 is used with a client 240 and a driver, or when no client or driver is used. In both cases, the interdictor 210 intercepts network communications to and from the networked device 220 to add the extended functionality.

Where extension services 250 are allowed to register themselves with the interdictor 210 using a subscription registration, the interdictor 210 can determine when an event such as a scan, print or other event occurs relating to the subscription registration and inform the extension service of such. The event notification may be synchronous or asynchronous. The interdictor 210 thus acts as a means for adding external services to the functionality of the networked device 220 by altering communications between the client 240 and the networked device 220, or by altering communications to and from the networked device 220 where no client 240 is used.

An event registration by the extension service 250 at the interdictor may include various information such as a port number (or service name), a synchronous or asynchronous flag, how many bytes from a network stream or packet to include in the notification, an address (URL) to send the event notification to, a date and time when the event notification expires, and the service the notification pertains to. It may be up to either the interdictor 210 or the extension service 250 to control the operations that are to be altered.

The interdictor 210 is programmed to allow subscription registration of extension services 250 that will provide extended functionality. Typically, either a user of a computer attached to the network 230, or an administrator of the network 230, will select services to be added, and corresponding extension services 250 will be selected to provide extended functionality. The extension service 250 then may register an event registration with the interdictor 210, which will indicate a type of event for which extended functionality is to be provided for by the corresponding extension service 250. For example, if an extension service 250 is to provide an extended functionality to all scanned images on a networked device 220 such as a scanner, when data is received at the interdictor 210 from the networked device 220 indicating a scanned image, the interdictor 210 can notify the corresponding extension service 250 by sending an event notification.

When a request (incoming), response (outgoing) or packet is received on a network port, the interdictor 210 may notify all extension services 250 that have matching event registrations. If more than one extension service 250 matches, the interdictor 210 will notify all matching extension services 250 by sending event notifications. The event notification will typically include a header of data from the request, response or packet.

In response, the extension service 250 provides one of several replies. The extension service 250 can request more data to make a decision. A request for more data may be repeated as required. The interdictor 210 can respond by sending the requested data or indicating that no more data is available.

Where a client 240 is used, the response from the extension service 250 to the interdictor may contain data to be sent by the interdictor 210 to the client 240, when the client would be expecting a response from the networked device 220. The extension service 250 can in effect preempt the response to a request, e.g., to cancel a print or scan job without notifying the networked device 220. This may happen when the client 240 is expecting a response.

The extension service 250 may also instruct the interdictor 210 to simply ignore a request from the networked device 220. The extension service 250 can respond by indicating no interest and that it wants no further information about the connection or exchange of data.

When appropriate, the extension service 250 may need to replace some of the data sent to it in an event notification by the interdictor 210, or to add to the data. The response from the extension service 250 may instruct the interdictor 210 to replace or add to the data communications between the networked device 220 and the client 240, and may supply the data, which may be extended functionality data. In this way, the interdictor 210 does not have to analyze the data from the networked device 220 or from the client 240, but instead will merely modify the data as instructed. The interdictor 210 replaces or adds to the data and forwards it as needed, together with the remaining data. For example, the extension service 250 may instruct the interdictor 210 to add data that will result in the watermark or other extended functionality being added.

The interdictor 210 may also forward all of the data to the extension service 250, where it can be modified as needed, sent back to the interdictor 210, and forwarded by the interdictor 210 to either the client 240 or to the networked device 220.

The interdictor 210 may use port forwarding to forward traffic sent to the networked device 220, and use Networked Address Translation (NAT) to forward data sent by the networked device. This requires no alteration to the networked device 220, and is thus manufacturer and model independent.

Figure 3:
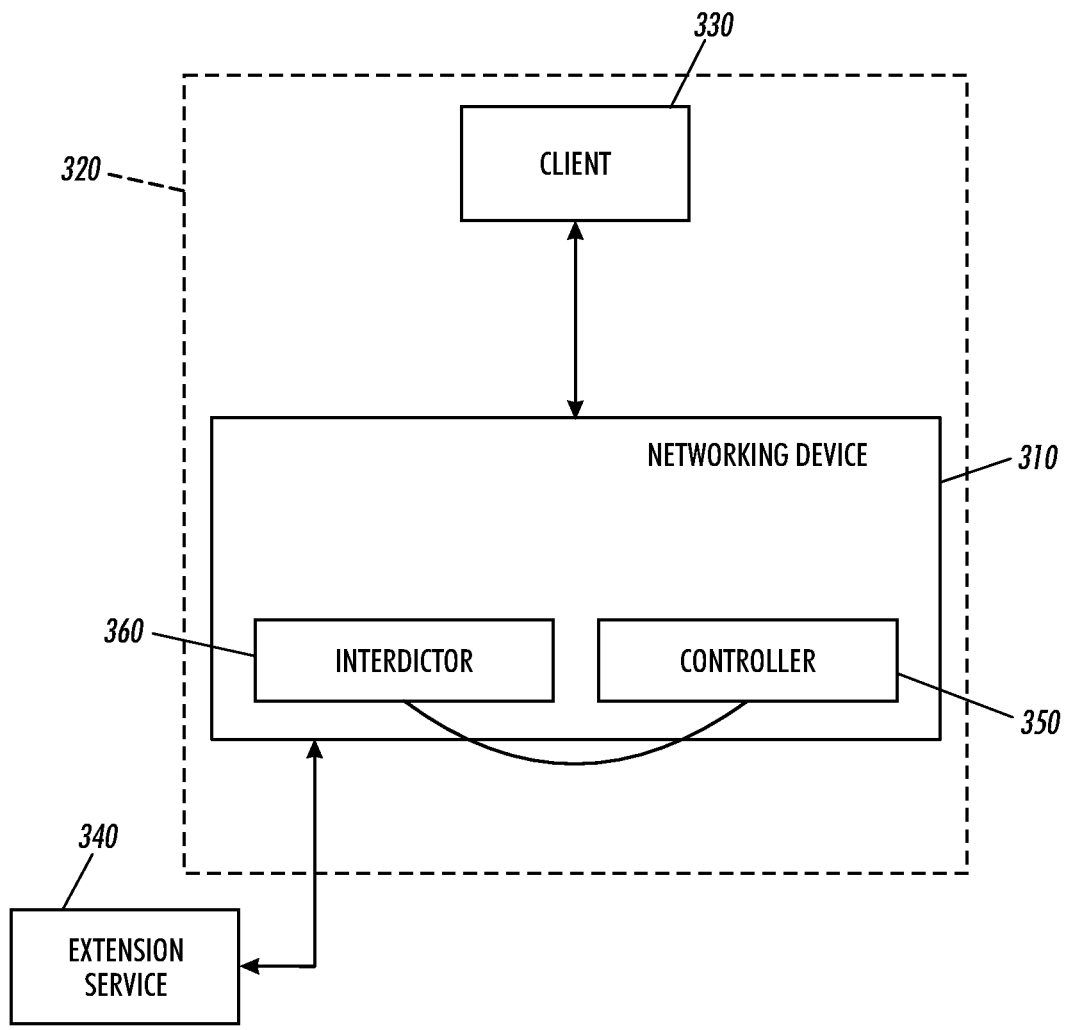
FIG. 3 illustrates a block diagram a network including an apparatus for providing extended functionality to a networked device.

FIG. 3 illustrates an embodiment in which the networked device 310 has included therein a controller 350 and an interdictor 360 as part of the networked device. The client 330 is used when appropriate, but may not be needed such as in the case of clientless scanning and the like. The interdictor 360 can function in the same manner as the interdictor 210. The interdictor 360 could be embodied in a special purpose circuit board, which may be added to the networked device 310, such as being slid into a card slot. In such a configuration, the controller 350 is a distinct hardware element of the networked device 310. The interdictor 360 can interact with the client 330 and the extension service 340 in the same manner as described in accordance with the corresponding elements of FIG. 2.

When the interdictor 360 is located within the networked device 310, it may instead run on the same physical hardware as the traditional controller of the networked device 310, but be run as a distinct software daemon or service without altering the traditional controller software. The interdictor 360 can bind to external network ports of the networked device 310, and use a network loopback interface to communicate with controller 350. The controller 350 may bind to non-standard network ports, to which the interdictor 360 forwards data from the standard ports. This maintains a clear separation between the interdictor 360 and the controller 350, while allowing interdiction without requiring additional hardware.

The extension service 250, 340 may function to construct a self-contained application to add the extended functionality, which may be pushed to and stored at the interdictor 210, 360, where it may be run to modify data as needed. The interdictor 210, 360 can then provide a self-contained execution environment that can modify data, without the need to send it back and forth to the extension service 250, 340, thus providing a gain in efficiency.

The networked device 310 is connected in network 320 to one or more client devices 330 (when used), which may be a print spooler or other client on a server, for example, and alternatively could be a computer used by a user. The extension service may be located outside of the network 320, as shown in FIG. 3 or inside the network 320.

Embodiments may also include computer-readable medium for carrying or having computer-executable instructions or data structures stored thereon. Such computer-readable medium can be any available medium that can be accessed by a general purpose or special purpose computer. By way of example, and not limitation, such computer-readable medium can comprise RAM, ROM, EEPROM, CD-ROM or other optical disk storage, magnetic disk storage or other magnetic storage devices, or any other medium which can be used to carry or store desired program code means in the form of computer-executable instructions or data structures. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable medium.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, and the like that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described therein. The instructions for carrying out the functionality of the disclosed embodiments may be stored on such a computer-readable medium.

The instructions from a computer-readable medium may be used by an electronic device, such as first electronic device 210, to cause the functionality of the embodiments to occur. These instructions may be loaded into a memory of the first electronic device 210 to be executed by a processor as needed.

Figure 4:
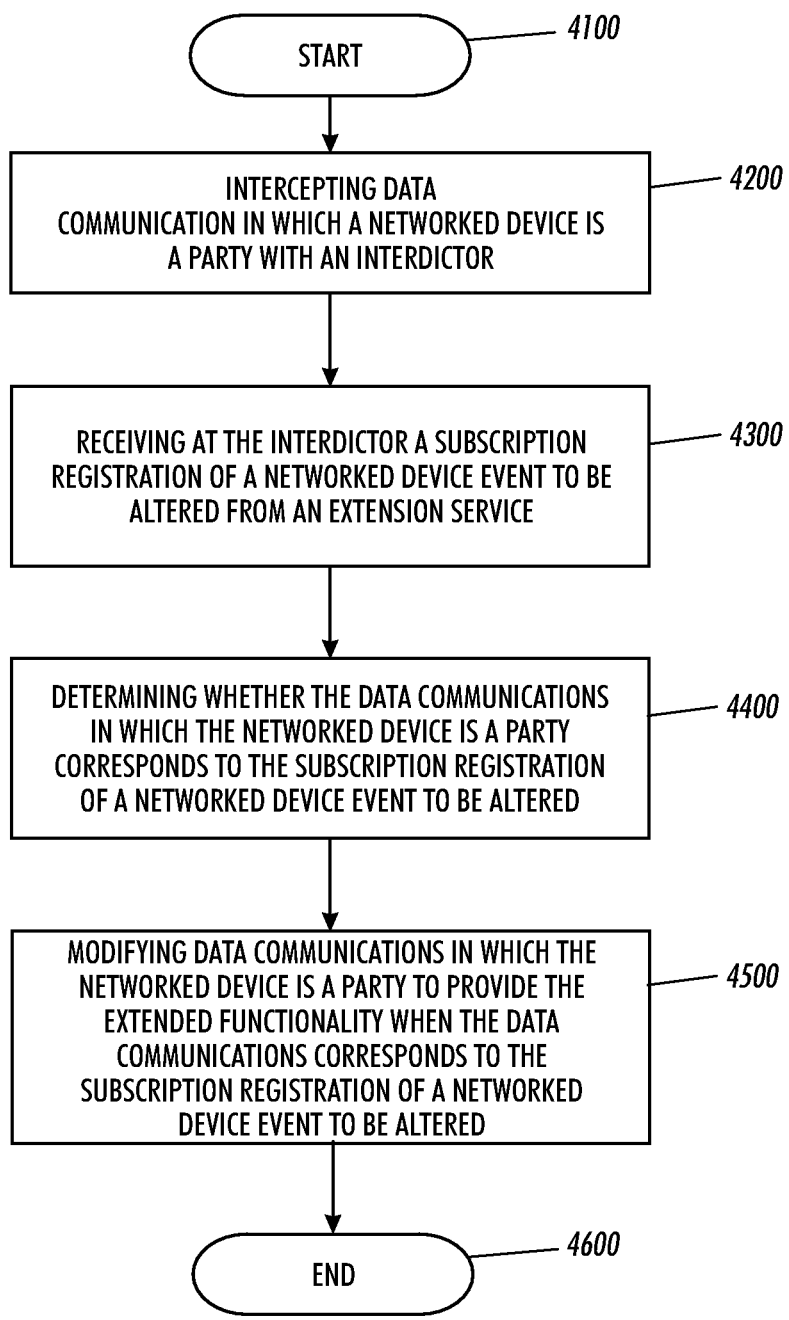
FIG. 4 illustrates a flowchart of a method for providing extended functionality to a networked device.

FIG. 4 illustrates a flowchart of a method for providing extended functionality to a networked device. The method starts at 4100. At 4200, data communications in which a networked device is a party are intercepted with an interdictor. At 4300, a subscription registration of a networked device event to be altered is received at the interdictor from an extension service.

At 4400, it is determined whether data communications in which the networked device is a party correspond to subscription registration of a networked device event to be altered. At 4500, data communications between in which the networked device is a party are modified to provide the extended functionality when it is determined that the data communications in which the networked device is a party corresponds to the subscription registration of a networked device event to be altered. At 4600, the method ends.

In addition to the disclosure of subject matter related to extending functionality of networked devices, as discussed above, this disclosure provides a convenient method and system for adding security features to printed documents without requiring extensive alterations to either the devices which produce the documents or to the workflow of the enterprise which want to produce such documents. The security features can be customized to be dynamic and domain-specific, without requiring further alterations of the printing equipment or client software used to print the document. This provides an easy and cost-effective path to adoption.

For example, it is possible to add security features to printed documents for later verification. Examples include Glossmarks, Microtext, pantographs, infra-red embedded images, ultra-violet embedded images and correlation marks. There are many such current and future techniques. This disclosure mentions Microtext as one example, but contemplates any such technique appearing as a printed region of a printed document. The disclosure specifically addresses printed security techniques which are possible on classes of current and future machines manufactured for general use, i.e. not specifically for insertion of the security features.

It is desirable that the particular security features which are inserted into a printed document contain dynamic elements. Typically these dynamic elements reflect policy decisions taken by the enterprise which produces the printed document. They may vary from print job to print job, or remain constant for periods of time, and they are typically specific to the domains which the documents form part of (which industry, which firm within that industry, and so on).

Three approaches are currently known for achieving insertion of these security features:

1. The device may be altered so that it inserts the security feature, perhaps controlled through some enterprise policy as determined by a policy server within the enterprise. Altering devices to do this is expensive and requires extensive justification in sales volumes before it becomes commercially worthwhile. The more specific the customization of the security features becomes, the harder it is to overcome this barrier, as the domain of application is correspondingly restricted.
2. The driver software used by print clients can be altered to insert the security features, perhaps in conjunction with a policy server as above. However, this requires distribution of special drivers to all the print clients which wish to use those features. The burden of distribution and system administration required increases in proportion to the number of print clients involved. It is also not possible to force print clients to use those drivers without, as above, altering the print devices themselves to require this, making it difficult to enforce insertion of security features regardless of user choice. Moreover, users may be able to save the job created by the driver to a file before it is sent, and perhaps alter the security feature, e.g. edit the Microtext string.
3. The software applications used to edit the electronic documents which are printed may be modified to insert the security features. As in the driver case, this requires distribution of special software applications to all clients, and the burden of doing so is proportional to the size of the user population. Again, it is difficult to enforce use of such client software, as users may simply use other software to edit and print documents. The same concern raised above about users editing the security feature before it is printed applies equally here.

This disclosure provides methods and systems for insertion of security features in documents which overcomes the drawbacks mentioned above. Print jobs between clients and print devices are interdicted (see U.S. application Ser. No. 12/145,591, filed on Jun. 25, 2008, entitled "METHOD AND APPARATUS FOR EXTENDING FUNCTIONALITY OF NETWORKED DEVICES," by Tredoux, for full details of the general interdiction technique) by a Security Features Service based on enterprise policies, and the security features are inserted in the corresponding print jobs before they reach the printing device. The inserted features may depend on content from or characteristics of the print job, which is supplied to the Security Service. This means that neither the devices nor the clients have to be altered to permit insertion of the security features. The Security Features service determines which dynamic content should be inserted based decision made by a Policy Server, and standard information already contained in the print job itself.

The method used for insertion of the security features in the print job corresponds to and depends on the particular security feature and the target printing device. In the most common case, the print job is in the Postscript™ Page Description Language (PDL), and the Postscript is manipulated to insert the security feature. For example, if the feature is dynamic text appearing as a page footer in Microtext, the font required for Microtext is embedded in the Postscript job, and Postscript commands for drawing the dynamic text footer are inserted at the head of the stream of Postscript instructions, as in the example Postscript fragment below.

```
/infostring (INSERT YOUR STRING HERE) def
%% font name and scale
/microfont_name (micro_f7) def
/microfont_scale .84 def
/pgsize
{
   currentpagedevice /PageSize get aload pop /pageh exch def /pagew exch def
   % (pagesize = ) print pagew (  ) cvs print ( ) print pageh (  ) cvs =
   /xpos
   {
      pagew infostring stringwidth pop sub 2 div
   } def
   /ypos 36 def
} bind def
/showpage
{
   gsave initgraphics
   pgsize
   0.0 setgray
   microfont_name cvlit findfont microfont_scale scalefont setfont
   xpos ypos moveto
   infostring show
   xpos ypos microfont_scale 1.2 mul sub moveto
   (PrinterName = ) dup print show
   currentsystemparams /PrinterName known
   { currentsystemparams /PrinterName get } { (Unknown ) } ifelse dup show =
   grestore
   systemdict begin showpage end
} bind def
%% insert font here
%!PS-Adobe-3.0 Resource-Font
%%BoundingBox: 10 47 297 763
...
%% font follows . . .
```

Figure 5:
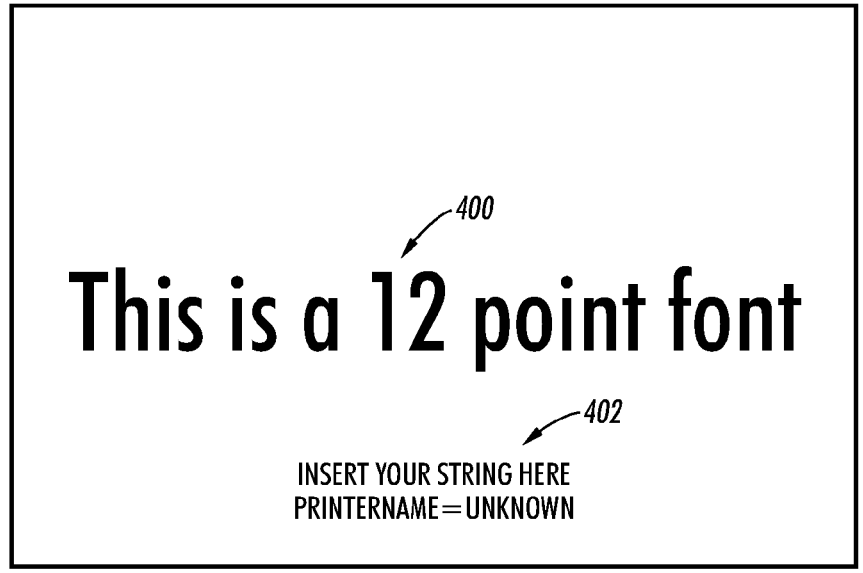
FIG. 5 illustrates one exemplary embodiment of microtext inserted into a document according to this disclosure.

The graphic illustrated in FIG. 5 shows Microtext "INSERT YOUR STRING HERE" 402 in relation to 12 point font 400, magnified together for normal readability.

An analogous technique can be used for a different PDL such as PCL PDF or HPGL. Corresponding techniques are used to place markers on other page regions, or within the printed text itself, or in the background of the printed page, and so on. The text in the footer is obtained from the Security Policy server on demand, for each job in question.

Because the insertion is achieved through interdiction, neither the software client which produces the print job nor the target device need be altered to achieve the insertion, which is opaque to both parties, and can be achieved regardless of their cooperation. Any office software for editing documents may be used as normal without considering the insertion of the security features.

Since the service which does this is realized through software, and does not run on the target printing device or the client, it can be run within an enterprise using existing print devices and existing print client configurations. Moreover, since the security features are determined dynamically and can be policy driven, the features can be customized to the business-specific problem domain ("vertical") at hand, without requiring custom device equipment (the drawbacks of which have been noted above).

Figure 6:
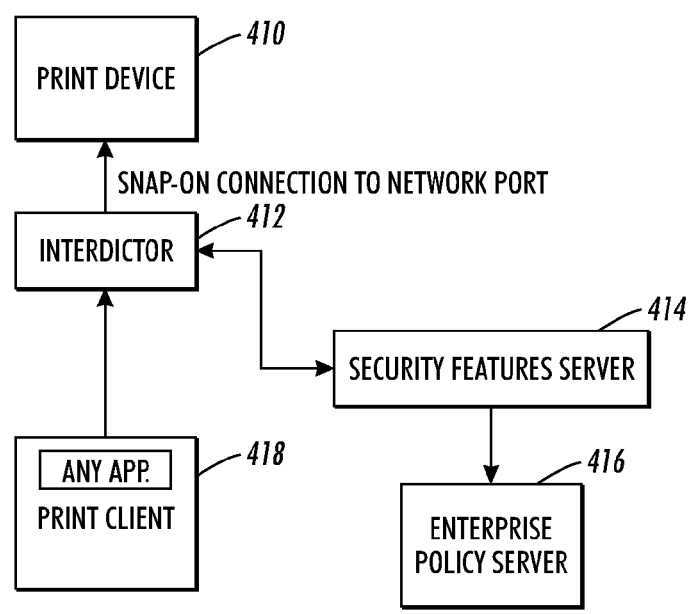
FIG. 6 illustrates a block diagram of a network including an interdictor according to an exemplary embodiment of this disclosure.

FIG. 6 illustrates the relationships between the components of the system described above, for a single device 410 and print client 418. Additional components include an interdictor 412, a security features server 414 and an enterprise policy server 416.

As the diagram shows in FIG. 6, print jobs are interdicted after they leave the client, and before they reach the device, en route. The method for doing this has already been disclosed and will not be further elaborated on here, expect to reemphasize that the interdictor may be realized in hardware that is "snapped onto" an existing device through its network connection. Alternatively, the interdictor may be housed as a separate component within the casing of the MFD itself, or incorporated into the MFD hardware itself, or simply be placed somewhere on the physical network connection going to the device.

In any case, the interdictor always has access to all device network traffic, both ingoing and outgoing. This disclosure reveals the use of this technique for the special application of inserting security features, and the specific service for doing so is revealed. In the system disclosed, a single Security Features Server may service many print devices and many clients at the same time. Again, more than one such server may be deployed to achieve scalability, without altering the essential concept.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A method of including a security feature within a document to be printed with a networked printing device, the networked printing device operatively connected to an interdictor, the interdictor configured to intercept and route data communications from a client service server without altering the data communications from the client service server, and the interdictor operatively connected to an extension service server remotely located from the interdictor, the method comprising:

the interdictor receiving a subscription registration communicated from the extension service server to authorize the interdictor to notify the extension service server of a networked device event communicated to the interdictor from the client service server, the networked device event associated with the extension service adding a security feature within the document to be printed with the networked device, and the security feature configured to aid in preventing unauthorized duplication of the printed document without any modification of the original content of the document except the inclusion of the security feature, wherein the subscription registration communicated from the extension service server is not controllable from the networked printing device;

the interdictor intercepting data communications from the client service server directed to the networked printing device, the intercepted data communications including a document file representative of the document to be printed;

the interdictor determining if the intercepted data communications directed to the networked printing device corresponds to the networked device event associated with the received subscription registration and the interdictor notifying the extension service server if the data communications correspond to the networked device event associated with the subscription registration intercepted and the interdictor routing the intercepted data communications to the networked printing device if the intercepted data communications do not correspond to the networked device event associated with the received subscription registration;

if the intercepted data communications received by the interdictor correspond to the networked device event associated with the received subscription registration, and the extension service server has been notified of the networked device event by the interdicter the extension service server requesting and receiving from the interdictor at least a portion of the data communications intercepted by the interdictor corresponding to the networked device event, and the extension service server modifying the intercepted data communications routed to the extension service server to include the security feature within the document to be printed with the networked printing device;

the extension service server routing the modified data communications to the interdictor; and the interdictor routing the modified data communications to the networked printing device for printing the document with the security feature.

2. The method of claim 1, wherein the security feature includes one or more of microtext, a glossmark, a pantograph, infra-red embedded images, ultra-violet embedded images, and correlation marks.

3. The method of claim 1, wherein the document to be printed includes one or more of text, graphics, and pictorial elements.

4. The method of claim 1, comprising:
printing the document including the security feature with the networked printing device.

5. An interdictor operatively connected to a network operatively connected to an extension service server, the interdictor comprising:

a computer-readable memory that stores instructions; and
a processor operatively connected to the memory, wherein the processor is configured to execute the stored instructions and perform a method of including a security feature within a document to be printed with a networked printing device, the networked printing device operatively connected to the interdictor, the interdictor configured to intercept and route data communications without altering the data communications from the client service server, and the interdictor operatively connected to an extension service server remotely located from the interdictor, the method comprising:

the interdictor receiving a subscription registration communicated from the extension service server to authorize the interdictor to notify the extension service server of a networked device event communicated to the interdictor from the client service server, the networked event device associated with which includes the extension service adding a security feature within the document to be printed with the networked device, and the security feature configured to aid in preventing unauthorized duplication of the printed document without any modification of the original content of the document except the inclusion of the security feature, wherein the subscription registration communicated from the extension service server is not controllable from the networked printing device;

the interdictor intercepting data communications from the client service server directed to the networked printing device, the intercepted data communications including a document file representative of the document to be printed;

the interdictor determining if the intercepted data communications directed to the networked printing device corresponds determining the networked device event associated with the received subscription registration and the interceptor notifying the extension service server if the data communications correspond to the networked device event associated with the subscription registration and the interceptor routing the intercepted data communications to the networked printing device if the intercepted data communications do not correspond to the networked device event associated with the received subscription registration;

if the intercepted data communications received by the interdictor correspond to the networked device event associated with the received subscription registration and the extension service server has been notified of the networked device event by the interdictor the extension service server requesting and receiving from the interdictor at least a portion of the data communications intercepted by the interdictor corresponding to the networked device event, and the extension service server modifying the intercepted data communications routed to the extension service server to include the security feature within the document to be printed with the networked printing device;

the interdictor receiving from the extension service server the modified data communications; and the interdictor routing the modified data communications from the interdictor to the networked printing device for printing the document with the security feature.

6. The interdictor according to claim 5, wherein the security feature includes one or more of microtext, a glossmark, a pantograph, infra-red embedded images, ultra-violet embedded images and correlation marks.

7. The interdictor according to claim 5, wherein the document to be printed includes one or more of text, graphics, and pictorial elements.

* * * * *